United States Patent
Kubo et al.

(10) Patent No.: US 8,036,075 B2
(45) Date of Patent: Oct. 11, 2011

(54) DISK DRIVE AND INFORMATION PROCESSING SYSTEM HAVING THE SAME

(75) Inventors: Mitsumasa Kubo, Tachikawa (JP); Yutaka Kobayashi, Musashino (JP)

(73) Assignee: TEAC Corporation, Tama-shi, Tokyo (JP)

( * ) Notice: Subject to any disclaimer, the term of this patent is extended or adjusted under 35 U.S.C. 154(b) by 506 days.

(21) Appl. No.: 12/060,053

(22) Filed: Mar. 31, 2008

(65) Prior Publication Data

US 2009/0016182 A1  Jan. 15, 2009

(30) Foreign Application Priority Data

Jul. 13, 2007  (JP) .................................. 2007-184679

(51) Int. Cl.
*G11B 20/10* (2006.01)
(52) U.S. Cl. ................. 369/47.33; 369/47.41; 369/47.38
(58) Field of Classification Search ............... 369/47.33, 369/47.38, 47.41
See application file for complete search history.

(56) References Cited

U.S. PATENT DOCUMENTS

| | | | |
|---|---|---|---|
| 5,572,380 A * | 11/1996 | Fujinami et al. | 360/73.03 |
| 6,603,719 B1 | 8/2003 | Wu | |
| 6,711,106 B2 | 3/2004 | Sasaki | |
| 6,901,039 B1 * | 5/2005 | Sugie et al. | 369/47.28 |
| 6,914,859 B2 | 7/2005 | Miyamoto | |
| 7,403,459 B2 * | 7/2008 | Chang | 369/53.3 |
| 2002/0024902 A1 | 2/2002 | Sakaki | |
| 2003/0152005 A1 | 8/2003 | Miyamoto | |
| 2005/0007918 A1 | 1/2005 | Tokudome | |
| 2007/0104055 A1 * | 5/2007 | Lenaerts | 369/47.38 |
| 2007/0153651 A1 * | 7/2007 | Lin et al. | 369/47.32 |

FOREIGN PATENT DOCUMENTS

| | | |
|---|---|---|
| JP | 3273423 | 12/1991 |
| JP | 2000-132901 A | 5/2000 |
| JP | 2001357601 | 12/2001 |
| JP | 2002-8316 A | 1/2002 |
| JP | 2002093039 | 3/2002 |
| JP | 2002367273 | 12/2002 |
| JP | 2003006990 | 1/2003 |
| JP | 2003203354 | 7/2003 |

(Continued)

OTHER PUBLICATIONS

Office Action relating to Chinese Patent Application No. 200810087292.1, mailed Jan. 22, 2010, 5 pages.

(Continued)

*Primary Examiner* — Aristotelis Psitos
(74) *Attorney, Agent, or Firm* — Seed IP Law Group PLLC (57) ABSTRACT

A disk drive and an information processing system optimizes the number of rotations of a disk. Data read from a disk and previously-read cache data are temporarily stored in buffer memory. When a total amount of cache data achieved during a given period of time T1 or an average amount of the same is equal to or less than a threshold value X1, a system controller controls the number of rotations in an increasing manner, thereby optimizing the number of rotations. When a total amount of cache data achieved during a given period of time T2 (T1<T2) or an average amount of the same is equal to or greater than a threshold value X2, a system controller controls the number of rotations in an decreasing manner, thereby optimizing the number of rotations.

10 Claims, 4 Drawing Sheets

FOREIGN PATENT DOCUMENTS

| | | |
|---|---|---|
| JP | 2003-242711 A | 8/2003 |
| JP | 2003272278 | 9/2003 |
| JP | 2004-362733 A | 12/2004 |
| JP | 2006-147119 A | 6/2006 |
| JP | 2007-48366 A | 2/2007 |
| JP | 2007502506 | 2/2007 |

OTHER PUBLICATIONS

English Language Translation of Office Action relating to Chinese Patent Application No. 200810087292.1, mailed Jan. 22, 2010, 4 pages.

Office Action mailed Sep. 21, 2010 in the corresponding Japanese Application No. 2007184679, 10 pages. (+ Translation).

* cited by examiner

DISK DRIVE AND INFORMATION PROCESSING SYSTEM HAVING THE SAME

PRIORITY INFORMATION

This application claims priority to Japanese Patent Application No. 2007-184679 filed on Jul. 13, 2007, which is incorporated herein by reference in its entirety.

BACKGROUND

1. Technical Field

The present invention relates to a disk drive and an information processing system having the disk drive, and more particularly to control of the number of rotations of a disk.

2. Related Art

Techniques for controlling the number of rotations of a disk to an optimum number of rotations have hitherto been proposed. For instance, JP2004-362733A describes a technique for comparing a cache activity ratio with two threshold values; namely, a high threshold value and a low threshold value, and controlling the number of rotations of a disk in accordance with results of comparison. Further, controlling the number of rotations in accordance with a command interval is also disclosed.

JP 2002-8316 A describes a technique for measuring an average transfer rate of data transferred from cache memory to a host; comparing the thus-measured average transfer rate with a threshold value; and controlling the number of rotations of a disk in accordance with a result of comparison.

JP 2007-48366 A describes a technique for increasing the rotational speed of a motor that rotates a disk when a transfer rate of data to be written/read exceeds a threshold value Rth and when a duration of time, in which the transfer rate exceeds the threshold value Rth, continues a threshold value Tth or more and decreasing the rotational speed of the motor that rotates the disk when a transfer rate of data to be written/read falls below the threshold value Rth and when a duration of time, in which the transfer rate falls below the threshold value Rth, continues the threshold value Tth or more.

JP 2006-147119 A describes a technique for identifying whether current operation is audio playback or ripping (capturing data from a CD or a DVD directly and into a personal computer or converting the data into an image file or another file format and capturing the thus-converted data into the personal computer) in accordance with the configuration of a command pattern issued without measurement of a transfer rate and determining the rotational speed of a disk.

JP 2000-132901 A describes a technique for controlling rotational speed in accordance with a file size.

Moreover, JP 2003-242711 A describes a technique for controlling the rotational speed of a disk in accordance with an idle time of a drive (a time elapsing from when execution of a command is completed until when performance of the next command is commenced).

Controlling the rotational speed of a disk in an incrementing or decrementing manner in accordance with the activity ratio of cache memory or the transfer rate of data is effective. However, drive load exerted on a motor changes from the case of an increase in rotational speed of a disk and the case of a decrease in rotational speed. Hence, control must be performed in consideration of this point. Moreover, cache memory is originally intended for enhancing a data read rate by increasing a hit rate, and hence nature of a command must be taken into account.

SUMMARY

The present invention provides an apparatus capable of controlling the number of rotations (or rotational speed) of a disk in a more accurate and rapid manner.

The present invention is directed toward a disk drive comprising memory for temporarily storing data read from a disk; and a control section that controls the number of rotations of the disk in an increasing or decreasing manner in accordance with amounts of data stored in the memory and that sets a determination timing for controlling the number of rotations in an increasing manner earlier than a determination timing for controlling the number of rotations in a decreasing manner.

In one embodiment of the present invention, the control section controls the number of rotations of the disk in an increasing or decreasing manner in accordance with a statistical value of the amounts of data achieved during a predetermined period of time; when the statistical value of the amounts of data achieved during a first period of time is equal to or less than a first threshold value, the number of rotations is controlled in an increasing manner; and, when the statistical value of the amounts of data achieved during a second period of time that is longer than the first period of time is equal to or greater than a second threshold value, the number of rotations is controlled in a decreasing manner.

The present invention is also directed toward a disk drive that reproducing data from a disk and that comprises memory for temporarily storing data read from a disk; and a control section that controls the number of rotations of the disk in an increasing or decreasing manner in accordance with amounts of data held in the memory and a nature of a command.

The disk drive of the present invention can be built into a host machine, such as a personal computer, or connected to the host machine so as to be able to exchange data, thereby constituting an information processing system.

According to the present invention, the number of rotations of a disk can be controlled adaptively and accurately.

The invention will be more clearly comprehended by reference to the embodiments provided below. However, the following embodiment is merely illustrative, and the scope of the invention is not limited to the embodiment.

BRIEF DESCRIPTION OF THE DRAWINGS

A preferred embodiment of the present invention will be described in detail by reference to the following drawings, wherein.

DETAILED DESCRIPTION

An embodiment of the present invention will be described hereunder by reference to the drawings by means of taking an optical disk drive as a disk drive. In addition to acting as a standalone drive, the optical disk drive of the present embodiment can function also as a portion of an information processing system that receives a command from a personal computer and reads data when incorporated into the personal computer, or the like, and that supplies the thus-read data to the personal computer.

First Embodiment

Figure 1:
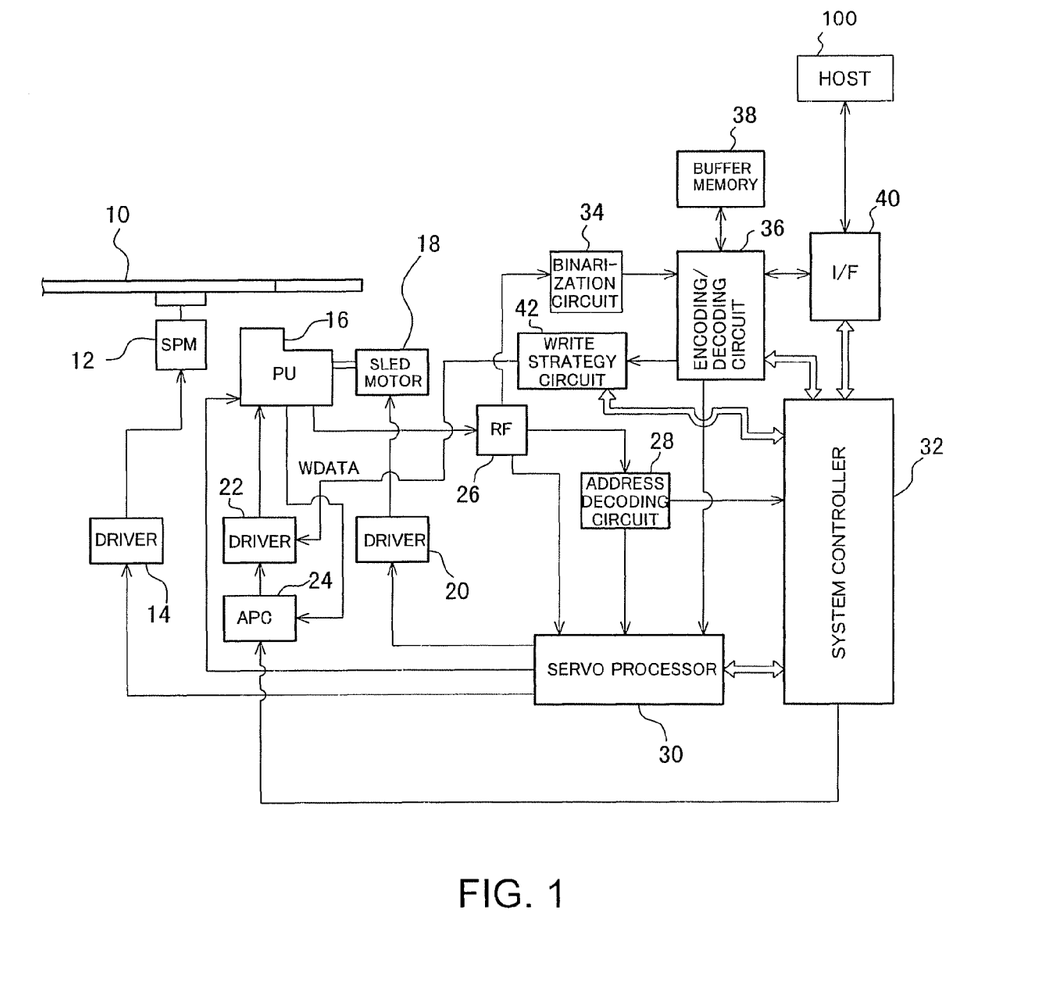
FIG. 1 is a block diagram of an optical disk apparatus of an embodiment of the present invention.

FIG. 1 shows the overall configuration of an information processing system including an optical disk drive of the embodiment. An optical disk 10, such as a CD, a DVD, an HD-DVD, and a BD (Blu-ray Disk), is rotationally driven by a spindle motor (SPM) 12. The spindle motor SPM 12 is driven by a driver 14, and the driver 14 is servo-controlled by a servo processor 30 so as to attain a desired rotational speed.

The optical pickup 16 includes a laser diode (LD) for radiating a laser beam onto the optical disk 10 and a photodetector (PD) that receives light reflected from the optical disk 10 and converts the thus-received light into an electric signal; and is disposed opposite the optical disk 10. The optical pickup 16 is driven in a radial direction of the optical disk 10 by means of a sled motor 18, and the sled motor 18 is driven by a driver 20. As is the case with the driver 14, the driver 20 is servo-controlled by the servo processor 30. The LD of the optical pickup 16 is driven by a driver 22, and the driver 22 controls, by an automatic power control circuit (APC) 24, the drive current in such a way that laser power comes to a desired value. The APC 24 and the driver 22 control amounts of light emission of the LD under an instruction from a system controller 32. In the drawing, the driver 22 is provided separately from the optical pickup 16, but the driver 22 may also be incorporated into the optical pickup 16.

A read command is issued by a host 100, such as a personal computer, into which the optical disk drive is to be incorporated. When data recorded in the optical disk 10 are read in response to the read command, a laser beam of reproducing power is emitted from the LD of the optical pickup 16; resultant reflected light is converted into an electric signal by the PD; and the electric signal is output. A reproduced signal from the optical pickup 16 is fed to an RF circuit 26. The RF circuit 26 generates from the reproduced signal a focus error signal and a tracking error signal and feeds the thus-generated signals to the servo processor 30. In accordance with these error signals, the servo processor 30 servo-controls the optical pickup 16, thereby maintaining the optical pickup 16 in on-focus and on-track states. Moreover, the RF circuit 26 feeds an address signal included in the reproduced signal to an address decoding circuit 28. The address decoding circuit 28 demodulates address data pertaining to the optical disk 10 from the address signal and feeds the thus-demodulated address data to the servo processor 30 and the system controller 32. The RF circuit 26 also feeds a reproduced RF signal to a binarization circuit 34. The binarization circuit 34 binarizes the reproduced signal and feeds the thus-acquired signal to an encoding/decoding circuit 36. The encoding/decoding circuit 36 subjects the binarized signal to demodulation and error correction, to thus acquire reproduced data. The reproduced data are output to the host 100, such as a personal computer, by way of an interface I/F 40. When the reproduced data are output to the host 100, the encoding/decoding circuit 36 outputs the reproduced data after temporarily storing the data in buffer memory 38.

A data block designated by the read command are stored in the buffer memory 38, and a previously-read data block is also stored as cache data in the buffer memory 38. As a result, when a sequential read command is next issued and performed, a data block does not need to be read from the optical disk 10, and the essential requirement is to read the data block from the buffer memory 38. Hence, a read speed is increased. A caching method using the buffer memory 38 is as follows:

(1) Pre-reading operation is performed even after execution of a read command, thereby leaving data cached in the buffer memory 38.

(2) The data block transferred to the host 100 by means of a read command is discarded from the buffer memory 38.

(3) When the read command is issued and when a data block designated by the read command is not present in the buffer memory 38, cache data are cleared, and execution of the read command is commenced.

A write command is issued by the host 100, such as a personal computer, into which the optical disk drive is incorporated. When data are recorded in the optical disk 10 in response to the write command, data to be recorded transmitted from the host 100 are fed to the encoding/decoding circuit 36 by way of the interface I/F 40. The encoding/decoding circuit 36 stores in the buffer memory 38 the data to be recorded; encodes the data to be recorded; and feeds the thus-encoded data as modulated data to a write strategy circuit 42. In accordance with a predetermined recording strategy, the write strategy circuit 42 converts the modulated data into a multipulse (a pulse train), and feeds the multipulse as record data to the driver 22. Since the recording strategy affects recording quality, the strategy is fixed to a certain optimum strategy. The laser beam whose power is modulated by record data is emitted from the LD of the optical pickup 16, whereupon data are recorded in the optical disk 10. After recording of data, the optical pickup 16 radiates a laser beam of reproducing power, thereby reproducing the record data; and feeds the record data to the RF circuit 26. The RF circuit 26 feeds a reproduced signal to the binarization circuit 34, and the thus-binarized data are fed to the encoding/decoding circuit 36. The encoding/decoding circuit 36 decodes the modulated data, and verifies the thus-decoded data against record data stored in the buffer memory 38. A result of verification is fed to the system controller 32. The system controller 32 determines whether to continually record data in accordance with the result of verification or to perform alternating operation.

In such a configuration, attention is paid to the amount of cache data temporarily stored in the buffer memory 38, and the number of rotations of the optical disk 10 is controlled in accordance with the amount of cache data. Specifically, the system controller 32 computes an average amount of cache data in the buffer memory 38 achieved during a predetermined period of time and compares the average amount of data with a threshold value, thereby determining whether or not the current number of rotations is suitable and performing control operation. Two threshold values; namely, a first threshold value and a second threshold value, are prepared as the threshold values, and a relationship of the first threshold value<the second threshold value is assumed to stand. The average amount of data is compared with the first threshold value. When the average amount of data is equal to or less than the first threshold value, the amount of previously-read cache data is determined to be insufficient; namely, the number of rotations of the optical disk 10, is determined to be too small, and control is performed so as to increase the number of rotations of the spindle motor 12. Moreover, when the average amount of data is compared with the second threshold value and when the average amount of data is equal to or greater than the second threshold value, the previously-read cache data are determined to be too excessive; namely, the number of rotations of the optical disk 10, is determined to be uselessly high, and control is performed so as to reduce the number of rotations of the spindle motor 12. In particular, as the amount of cache data becomes large, a hit rate (a rate of presence of data to be read in the buffer memory 38) is enhanced. However, a uselessly-large amount of cache data is not preferable in view of noise and power consumption. Hence, control operation for reducing the number of rotations is actively performed. Put another way, control operation can be said to minimize the number of rotations without involvement of a decrease in average data transfer rate, thereby reducing noise and power consumption.

Drive load exerted on the spindle motor 12 changes from the case of an increase in the number of rotations of the optical disk 10 to the case of a decrease in the number of rotations. In the case of an increase in the number of rotations, greater load is required, and increasing the number of rotations to a desired level requires a time. Therefore, the followings are required in order to enhance controllability by means of achieving an essentially-equal total time required from when a necessity for controlling the number of rotations in an increasing or decreasing manner is determined by means of comparing an average amount of data with a threshold value until when the number of rotations is actually controlled. Namely, a control instruction must be supplied to the spindle motor 12 at faster timing when control is performed so as to increase the number of rotations than when control is performed so as to decrease the number of rotations. To this end, timing at which the average amount of data is compared with the first threshold value; namely, a determination is made as to whether or not to increase the number of rotations, must be made faster than timing at which the average amount of data is compared with the second threshold value; that is, a determination is made as to whether or not to decrease the number of rotations. Accordingly, a determination is first made as to whether or not to increase the number of rotations, and another determination is then made as to whether or not to decrease the number of rotations. An average amount of data acquired during a period of first predetermined time since initiation of measurement is computed, and the thus-computed average amount of data is compared with the first threshold value. Next, an average amount of data acquired during a period of second predetermined time (the period of first predetermined time<the period of second predetermined time) since initiation of measurement is computed, and the thus-computed average amount of data is compared with the second threshold value.

The number of rotations can also be controlled by means of comparing the threshold value with a total amount of data acquired during a period of predetermined time rather than with the average amount of data acquired during a period of predetermined time.

Figure 2:
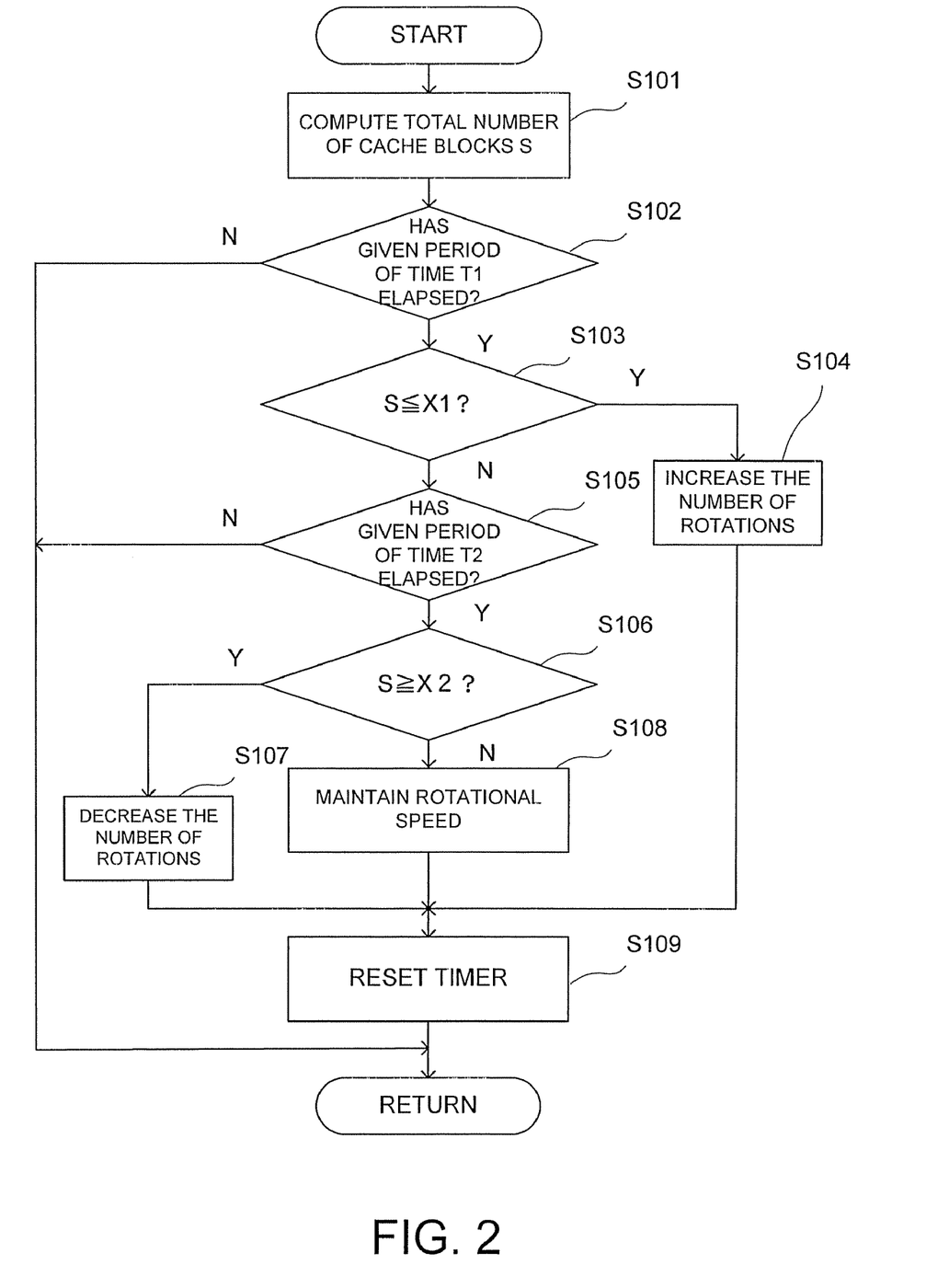
FIG. 2 is a flowchart of the present embodiment.

FIG. 2 shows a flowchart pertaining to control of the number of rotations in the embodiment. This is a case where a total amount of data achieved during a period of predetermined time is compared with a threshold value. First, the system controller 32 repeatedly computes a total number of cache blocks S stored in the buffer memory 38 at predetermined time intervals (S101). By means of interrupt processing, a determination is made as to whether or not a given period of time T1 has elapsed since the timer started measurement (S102). When a given period of time T1 has elapsed; namely, when the total number of cache blocks S achieved during a given period of time T1 is computed, the total number of cache blocks S is compared with the first threshold value X1 (S103). The first threshold value X1 is for determining whether or not there is a necessity for increasing the number of rotations. In the case of $S \leq X1$, the system controller 32 transmits a control instruction to the servo processor 30, and the servo processor 30 increases the number of rotations of the spindle motor 12 by way of the driver 14 (S104). In the case of S>X1, a determination is made as to whether or not a given period of time T2 has elapsed since commencement of the next measurement (S105). Here, T1<T2 is achieved. When the given period of time T2 has elapsed, the total number of cache blocks S achieved during the given period of time T2 is compared with the threshold value X2 (S106). The second threshold value X2 is for determining whether or not there is a necessity for decreasing the number of rotations, and X1<X2 is achieved. In the case of $S \geq X2$, the system controller 32 transmits the control instruction to the servo processor 30, and the servo processor 30 decreases the number of rotations of the spindle motor 12 by way of the driver 14 (S107). In the meantime, in the case of S<X2, the current number of rotations is maintained without increasing or decreasing the number of rotations (S108). After adjustment of the number of rotations, a timer is reset (S109), and processing subsequent to S101 is iterated. When NO is rendered as a determination in S102 or S105, processing pertaining to S101 is maintained. When the given period of time T2 has not yet elapsed in S105, the number of blocks S is continually computed in S101. Hence, attention is paid to the fact that the number of blocks S achieved in the predetermined period of time T1 usually differs from the number of blocks S achieved in the predetermined period of time T2.

When the number of rotations is increased in S104 or the number of rotations is decreased in S107 during processing shown in FIG. 2, the number of rotations may also be sequentially increased or decreased one step at a time. The reason for this is that a sudden increase or decrease in the number of rotations may cause a deviation from a lock range of a PLL circuit for reproducing (reading) data (from a disk) or throw the driver out of servo-control under influence of disturbance of a disk, thereby interrupting reproduction of data. For instance, when the number of rotations can be changed to 4× speed, 6× speed, 8× speed, and 10× speed and when the current number of rotations is 6× speed, the rotational speed is first increased from 6× speed to 8× speed when the number of rotations is increased, and is further increased from 8× speed to 10× speed. Namely, the number of rotations is increased or decreased within a range where reproduction of data is not interrupted. Further, in processing shown in FIG. 2, the total number of cache blocks S is compared with the first threshold value X1. When $S \leq X1$ is achieved, the number of rotations is immediately increased. However, in accordance with nature of the command, a determination may further be made as to whether or not to increase the number of rotations. For instance, when the nature of the command corresponds to a seek command as in random access memory, holding cache data in the buffer memory 38 is meaningless, and hence the cache data are discarded. The total number of cache blocks S is reduced by discarding operation, so that a relationship of $S \leq X1$ can be achieved. However, since increasing the number of rotations in this case is not preferable, control for increasing the number of rotations is not performed even in the case of; for example, $S \leq X1$, when the nature of the command corresponds to a seek command.

Figure 3:
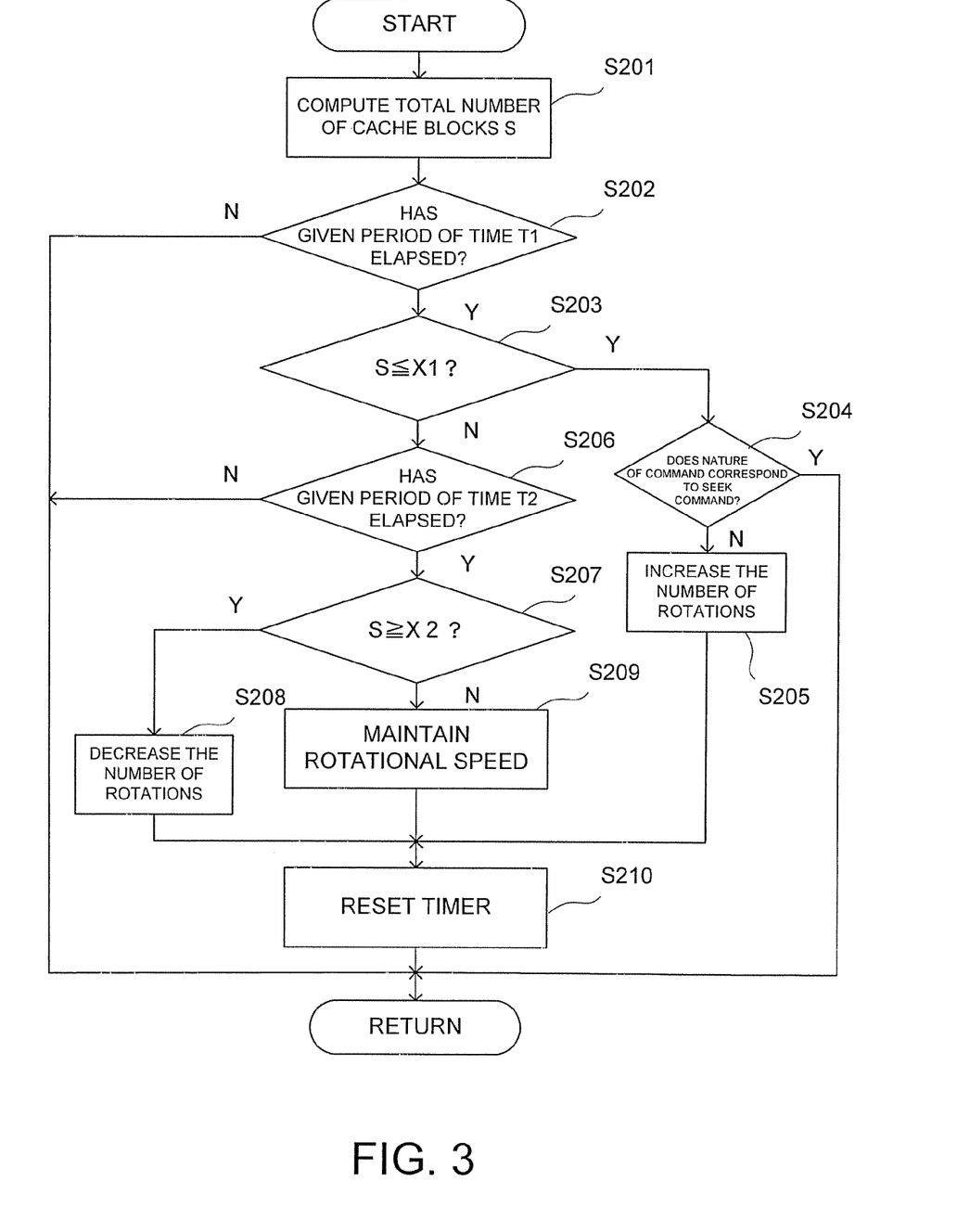
FIG. 3 is another flowchart of the embodiment.

FIG. 3 shows a flowchart of processing performed in this case. As in the case of the embodiment shown in FIG. 2, the total number of cache blocks S achieved in the given period of time T1 is computed (S201 and S202), and the thus-computed number of cache blocks is compared with the first threshold value X1 (S203). In the case of $S \leq X1$, a determination is made as to whether or not the nature of the command corresponds to the seek command (S204). When the nature of the command corresponds to the seek command, the cache data are determined to have been discarded in association with execution of the seek command rather than for reasons of the number of rotations being inappropriate, and control for increasing the number of rotations is not performed. In the meantime, when the nature of the command does not correspond to the seek command, the number of rotations is increased as in FIG. 2 (S205). Processing pertaining to S206 to S210 is analogous to that pertaining to S105 to S109 shown in FIG. 2.

The total number of cache blocks S is compared with the second threshold value X2 during processing shown in FIG. 2. When a relationship of S≧2 stands, the number of rotations is decreased. However, control for decreasing the number of rotations in accordance with the nature of the command can also be changed. For instance, when a previous command is a sequential read command, there is a high probability that the next command will be a sequential command and that a hit of cache data will be found. For these reasons, gradually decreasing the number of rotations one step at a time rather than immediately decreasing the same is preferable. Conversely, when the nature of the command does not correspond to the sequential command but a seek command as in the case of a random access, the current number of rotations is maintained without performing control operation for decreasing the number of rotations. Moreover, when a command is not issued for a given period of time, the number of rotations is decreased to the minimum number of rotations right away. The system controller 32 measures intervals at which a command is issued.

Figure 4:
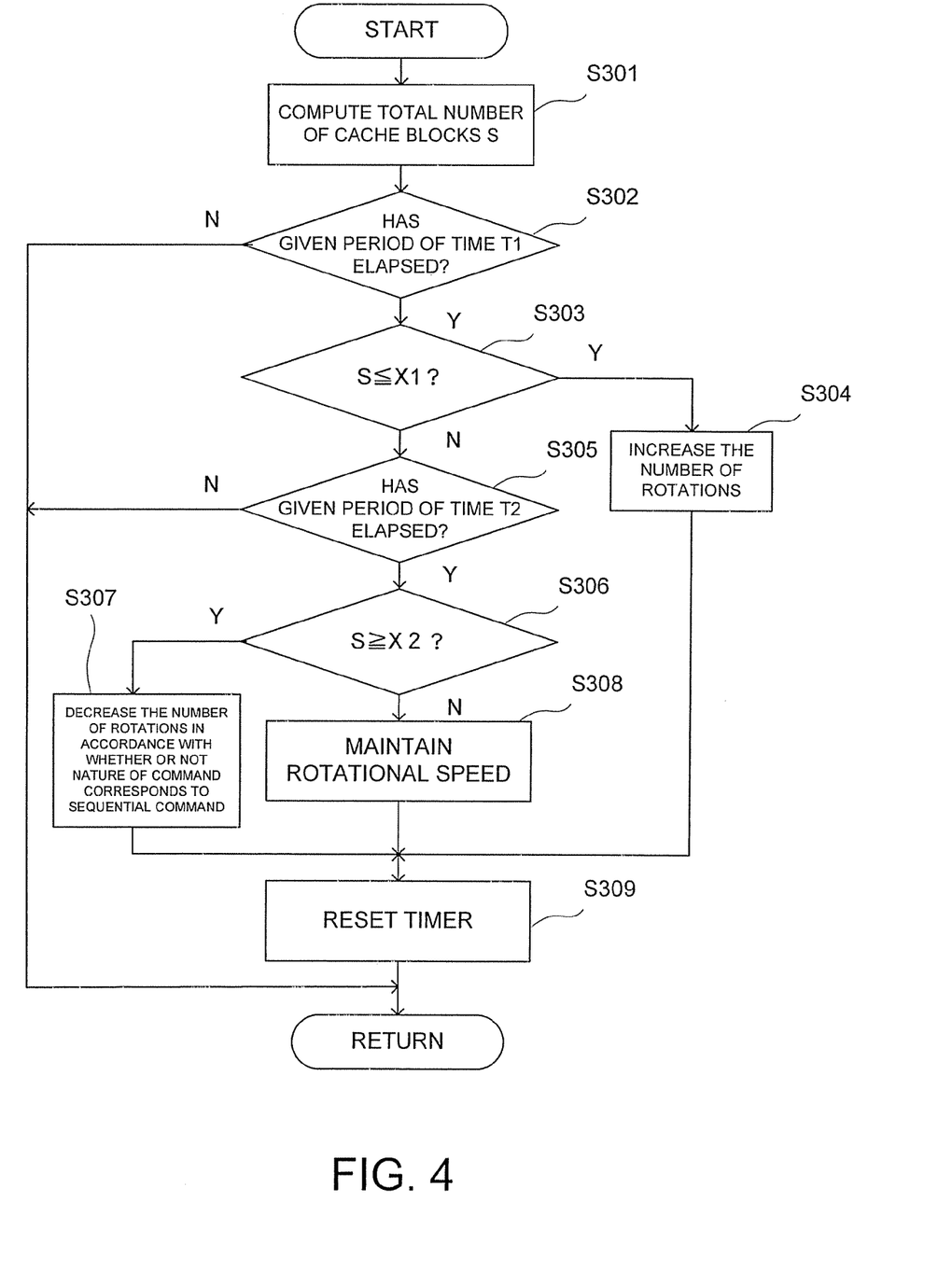
FIG. 4 is yet another flowchart of the embodiment.

FIG. 4 shows a flowchart of processing performed in this case. As in the case of processing shown in FIG. 2, the total number of cache blocks S achieved during a given period of time T1 is computed (S301 and S302), and the thus-computed number of cache blocks S is compared with the first threshold value X1 (S303). When a relationship of S≦X1 stands, the number of rotations is increased (S304). When a relationship of S>X1 stands, the total number of cache blocks S achieved during a given period of time t2 is computed, and the thus-computed number of cache blocks is compared with the second threshold value X2 (S305, S306). When a relationship of S≧X2 stands, a determination is further made as to whether or not the nature of the command corresponds to a sequential command. The manner of a decrease in the number of rotations is changed according to whether or not the nature of the command is the sequential command (S307). A determination as to whether or not the nature of the command corresponds to the sequential command is made on the basis of the nature of the previous command. When the nature of the previous command corresponds to the sequential command, the nature of the next command is also assumed to correspond to a sequential command, the number of rotations is decreased one step. When the nature of the command corresponds to the sequential command, not performing control for decreasing the number of rotations is optional. In the meantime, when the nature of the command corresponds to a seek command, control for decreasing the number of rotations is not performed. Moreover, when the command is not issued for a given period of time since the previous command, the number of rotations is decreased right away to the minimum number of rotations. Processing pertaining to S308 and S309 is analogous to processing pertaining to S108 and S109 shown in FIG. 2.

As mentioned above, when the number of rotations is controlled in an increasing or decreasing manner in accordance with amounts of cache data temporarily stored in the buffer memory 38 or the cache memory, a determination is made ahead of time as to whether or not there is a necessity for increasing the number of rotations, so that a time lag required when the number of rotations is increased can be compensated for. Moreover, the number of rotations can be controlled more accurately by means of controlling the number of rotations in an increasing or decreasing manner in accordance with the nature of a command and amounts of data rather than merely with amounts of data.

Second Embodiment

In the first embodiment, a necessity for increasing the number of rotations is made ahead of time. However, a determination as to whether or not controlling the number of rotations in an increasing or decreasing manner is required may also be made essentially simultaneously with performance of control of the number of rotations, and the nature of increasing/decreasing control operation may also be determined in accordance with a determination result and the nature of a command. Examples operations are as follows; namely, the total number of cache blocks S achieved during the given period of time T1 is computed and the thus-computed number of cache blocks is compared with the first threshold value X1 and the second threshold value X2. When a relationship of S≦X1 stands and when the nature of the command does not correspond to the seek command, the number of rotations is controlled in an increasing manner. In contrast, when a relationship of S≧X2 stands and when the nature of the command does not correspond to the seek command, the number of rotations is controlled in a decreasing manner. In this case, an average number of cache blocks achieved during the given period of time T1 may be computed, and the thus-computed average number may also be compared with the first threshold value and the second threshold value, respectively. Alternatively, the number of cache blocks may also be sampled at predetermined time intervals. When a time during which a sampled value becomes equal to or less than the first threshold value is a given period of time or more and when the nature of the command does not correspond to the seek command, the number of rotations is controlled in an increasing manner. When a time during which the sampled value becomes equal to or greater than the second threshold value is a given period of time or more and when the nature of the command does not correspond to the seek command, the number of rotations may also be controlled in a decreasing manner. When a determination is made as to whether or not the time has continued for a given period or more, either an average number of blocks or a total number of blocks will be acceptable. When the number of rotations is controlled in an increasing or decreasing manner, the number of rotations may also be sequentially increased or decreased one step at a time. Alternatively, when the command is not issued for a given period of time, the number of rotations may also be controlled so as to decrease straightaway to the minimum number of rotations. In short, the number of rotations is increased or decreased by combination of the relative amount of cache data temporarily stored in the buffer memory 38 or the cache memory and the nature of the command, whereby the number of rotations can be controlled more appropriately.

The total number of blocks achieved during a predetermined period of time can also be controlled in an increasing or decreasing manner by comparison with the first and second threshold values regardless of a timing at which a determination is made as to whether or not increasing or decreasing control of the number of rotations is required. Specifically, the total number of blocks achieved during a predetermined period of time is computed, and the total number is compared with the first and second threshold values. When the total number is equal to or less than the first threshold value, the number of rotations is controlled in an increasing manner. When the total number is equal to or greater than the second threshold value, the number of rotations is controlled in a decreasing manner. Even in such a case, the number of rotations may also be controlled in an increasing or decreasing manner in accordance with the nature of the command. When the nature of the command is a seek command as in a random access, the number of rotations is maintained. When the command is not issued for a given period of time, the number of rotations may also be decreased straightaway to the minimum number of rotations. Even when the number of rotations is increased or decreased, it is preferable to control the number of rotations in an increasing or decreasing manner within a range where reproduction of data is not interrupted.

What is claimed is:

1. A disk drive comprising:
    a memory that is configured to store data read from an optical disk;
    a control section that is configured to:
        increase a rotational speed of the optical disk when an elapsed time exceeds a first time threshold and an amount of the data stored in the memory is equal to or less than a first data threshold; and
        decrease the rotation al speed of the optical disk when the elapsed time exceeds a second time threshold and the amount of the data stored in the memory is equal to or greater than a second data threshold.

2. The disk drive of claim 1, wherein the control section is configured to maintain a current rotational speed of the optical disk when the amount of the data stored in the memory is less than the second data threshold.

3. The disk drive of claim 1, wherein the rotational speed of the optical disk is increased when a host command is not a seek command.

4. The disk drive of claim 1, wherein the rotational speed of the optical disk is decreased in accordance with receiving a sequential command.

5. The disk drive of claim 4, wherein the sequential command is a read command that is received after a previous read command.

6. The disk drive of claim 1, wherein the amount of data is an average number of cache blocks.

7. The disk drive of claim 1, wherein the amount of data is a total number of cache blocks.

8. The disk drive of claim 1, wherein the first time threshold is less than the second time threshold.

9. The disk drive of claim 1, wherein the first data threshold is less than the second data threshold.

10. A method comprising:
    computing an amount of data stored in a memory on an optical disk system during an elapsed time period; and
    changing a rotational speed of an optical disk by one of:
        increasing the rotational speed of the optical disk when the elapsed time period exceeds a first time threshold and the amount of data is equal to or less than a first data threshold; and
        decreasing the rotational speed of the optical disk when the elapsed time period exceeds a second time threshold and the amount of data is equal to or greater than a second data threshold.

* * * * *

UNITED STATES PATENT AND TRADEMARK OFFICE
CERTIFICATE OF CORRECTION

| | | |
|---|---|---|
| PATENT NO. | : 8,036,075 B2 | Page 1 of 1 |
| APPLICATION NO. | : 12/060053 | |
| DATED | : October 11, 2011 | |
| INVENTOR(S) | : Mitsumasa Kubo et al. | |

It is certified that error appears in the above-identified patent and that said Letters Patent is hereby corrected as shown below:

Column 9, Line 13:
"decrease the rotation al speed of the optical disk when" should read, --decrease the rotational speed of the optical disk when--.

Signed and Sealed this
Twenty-second Day of November, 2011

David J. Kappos
*Director of the United States Patent and Trademark Office*